Jan. 4, 1938. A. N. NICKERSON Re. 20,611

MACHINE FOR SPREADING AND SURFACING ROAD MATERIAL

Original Filed Aug. 4, 1933 5 Sheets-Sheet 1

Inventor
Alma N. Nickerson
by Wright Brown & Quinby
Attys.

Jan. 4, 1938. A. N. NICKERSON Re. 20,611
MACHINE FOR SPREADING AND SURFACING ROAD MATERIAL
Original Filed Aug. 4, 1933 5 Sheets-Sheet 2
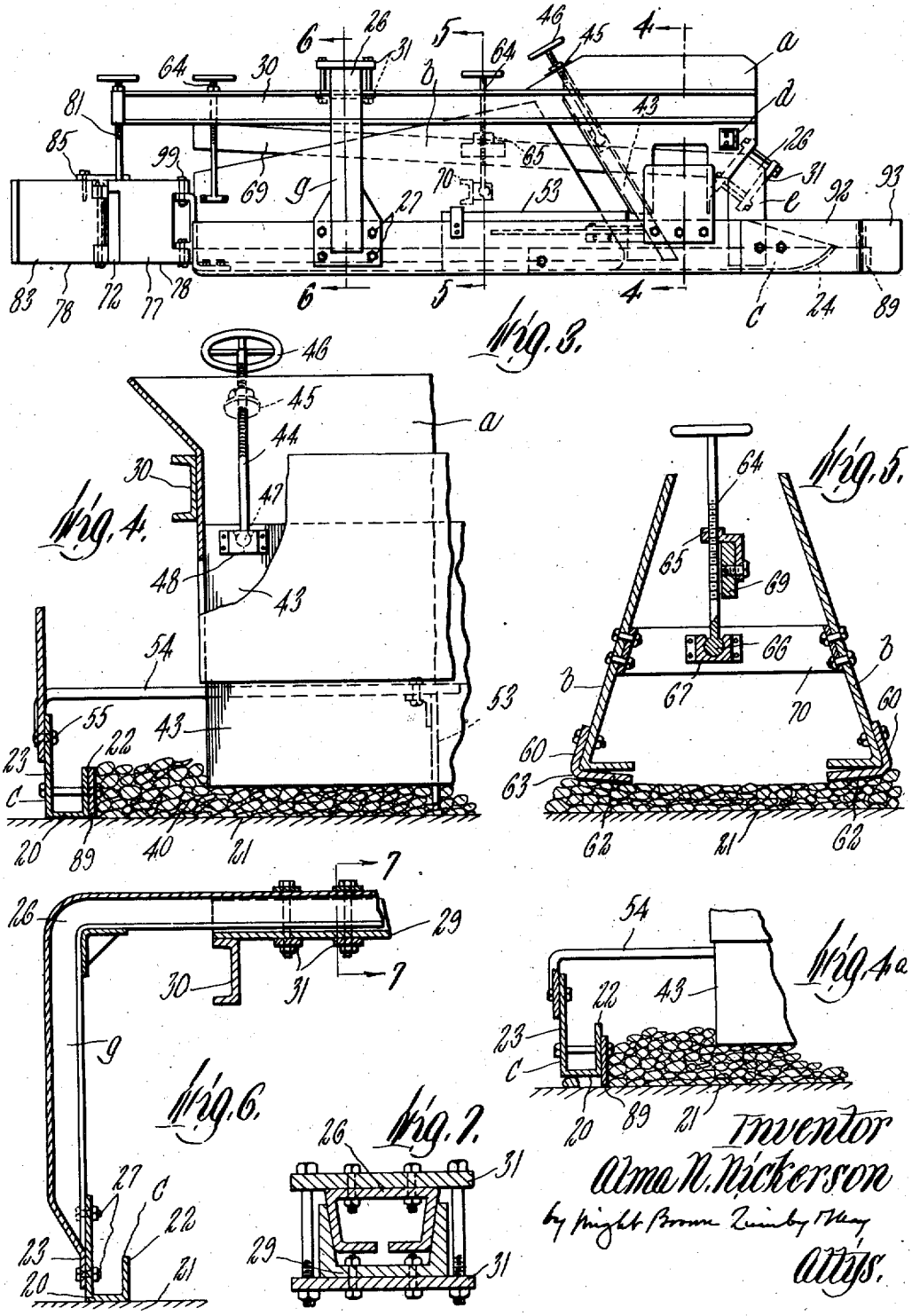
Inventor
Alma N. Nickerson
by Wright Brown Quinby & May
Attys.

MACHINE FOR SPREADING AND SURFACING ROAD MATERIAL
Original Filed Aug. 4, 1933 5 Sheets-Sheet 3
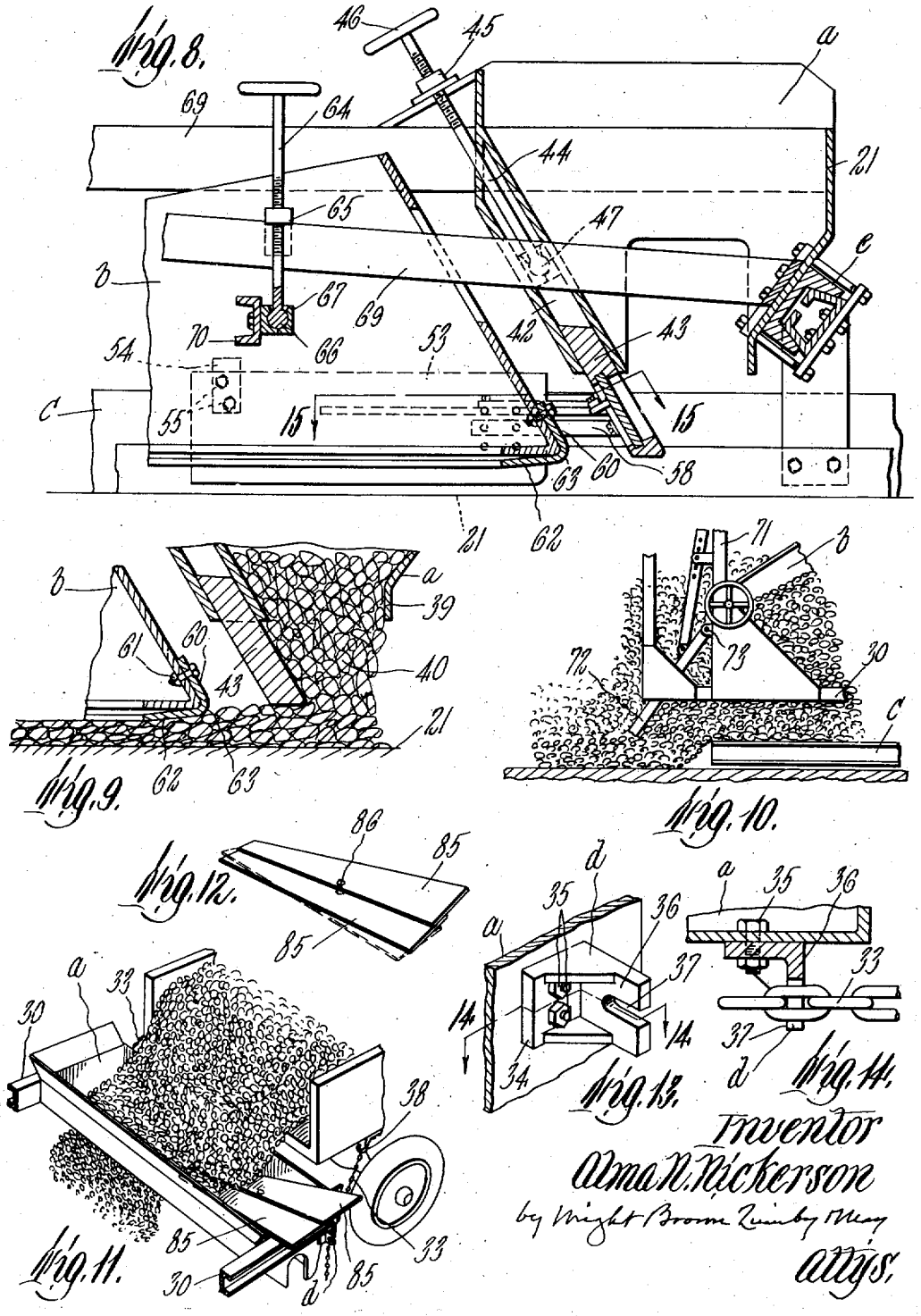

MACHINE FOR SPREADING AND SURFACING ROAD MATERIAL
Original Filed Aug. 4, 1933 5 Sheets-Sheet 4
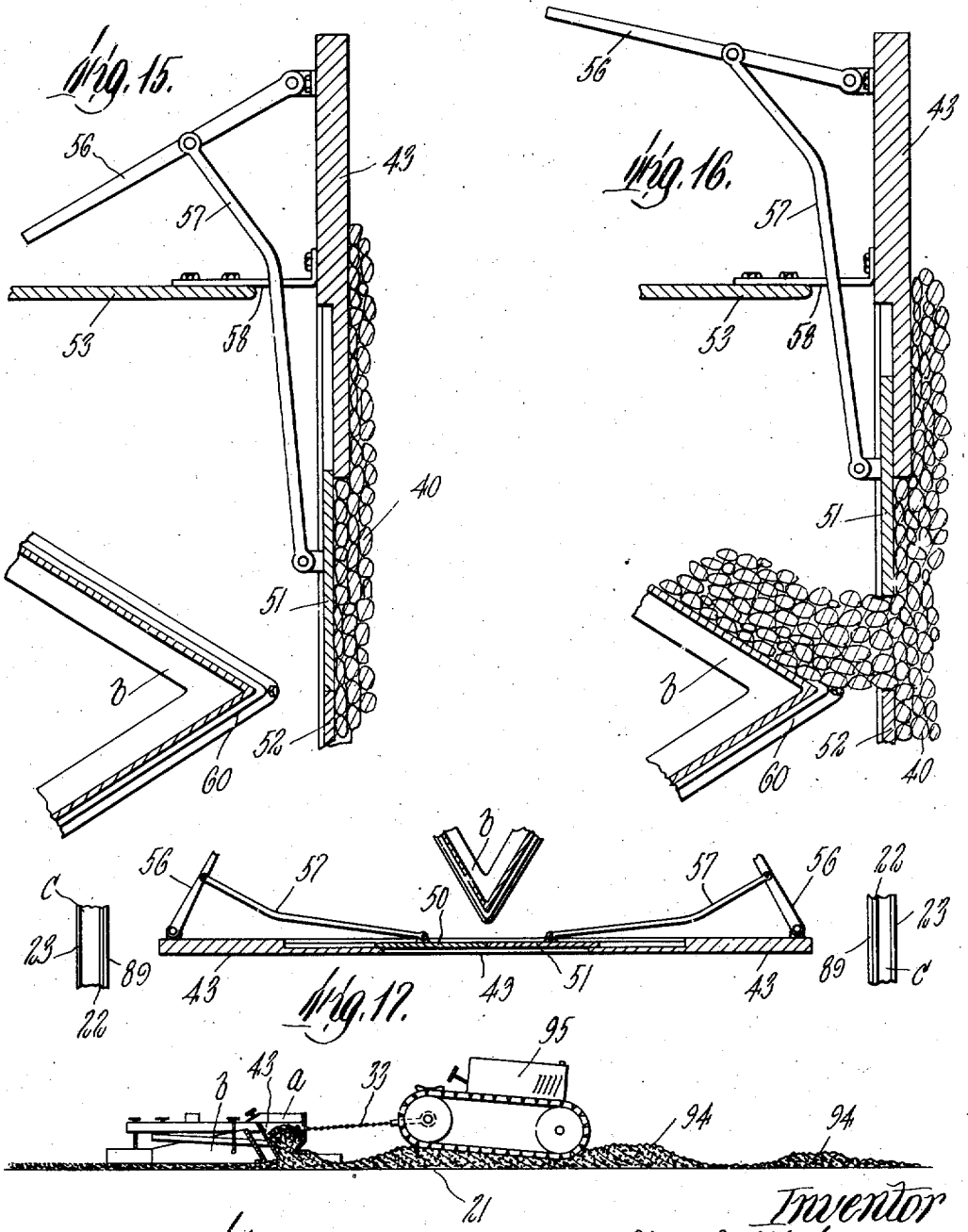
Inventor
Alma N. Nickerson
by Wright Brown Quinby & May
Attys.

Jan. 4, 1938. A. N. NICKERSON Re. 20,611

MACHINE FOR SPREADING AND SURFACING ROAD MATERIAL

Original Filed Aug. 4, 1933 5 Sheets-Sheet 5

Inventor
Alma N. Nickerson
by Wright Brown Quinby & May
Attys.

Reissued Jan. 4, 1938 Re. 20,611

UNITED STATES PATENT OFFICE 20,611

MACHINE FOR SPREADING AND SURFACING ROAD MATERIAL

Alma N. Nickerson, Plymouth, Mass.

Original No. 1,970,391, dated August 14, 1934, Serial No. 683,635, August 4, 1933. Application for reissue November 11, 1935, Serial No. 49,269

25 Claims. (Cl. 94—44)

This invention relates to that class of machines for spreading and surfacing road materials such as crushed stone, gravel, asphalt, etc., in which the machine is pulled over a road bed by a motor vehicle, which may be a truck from which the material is discharged, or a tractor which pulls the machine without supplying material to be spread by it.

One object of my invention is to provide a machine adapted to spread a layer of road material having an even surface over a comparatively uneven base.

Another object is to provide a machine adapted to regulate the width of a layer of road material to any desired degree to meet the different conditions of road building, including means to compensate for the side thrust due to such regulation so that the machine will substantially follow in the track of the vehicle drawing it.

Other objects will appear as the following description proceeds.

Of the accompanying drawings forming a part of this specification,—

Figure 3 is a side view of the machine.

Figure 4 is a fragmental section on line 4—4 of Figure 3.

Figure 4a is a view similar to a portion of Figure 4 showing one of the runners slightly raised from its path.

Figure 5 is a section on line 5—5 of Figure 3 showing the leveling plow, and the means for adjusting it.

Figure 6 is a fragmental section on line 6—6 of Figure 3.

Figure 7 is a section on line 7—7 of Figure 6.

Figure 8 is a fragmental section on line 8—8 of Figure 1.

Figure 9 is a fragmental sectional view showing portions of the gate and plow and illustrating a phase of the spreading operation.

Figure 10 is a fragmental plan view showing a portion of one runner, a portion of the frame, and parts associated with the frame.

Figure 11 is a fragmental perspective view showing a portion of a truck, a portion of the hopper receiving material from the truck, and a hopper contracting device associated with the hopper.

Figure 12 is a perspective view of the contracting device shown by Figure 11.

Figure 13 is a fragmental perspective view showing a clevis attached to the hopper and constituting an element of means connecting the machine with a motor vehicle.

Figure 14 is a section on the plane indicated by line 14—14 of Figure 13, showing a portion of a chain engaged with the clevis.

Figure 15 is a fragmental section on the plane indicated by line 15—15 of Figure 8, showing a portion of the hopper, the gate, a portion of the plow, and gate operating means associated with the hopper, the gate being closed.

Figure 16 is a view similar to Figure 15 showing the gate opened.

Figure 17 is a sectional view showing the hopper gates removed from the hopper.

Figure 18 is a diagrammatic view showing a tractor connected with the machine, and illustrating another phase of the spreading operation.

The same reference characters indicate the same parts in all of the figures.

The machine includes a frame supported by elongated runners, and constructed to carry at its forward portion a transversely extending hopper designated as a whole by *a*, and behind the hopper a screeding or strike-off member comprising an acute angled, vertically adjustable, leveling plow designated as a whole by *b*.

The frame is adjustable to vary the width of the machine and the distance between the runners.

Figure 2:
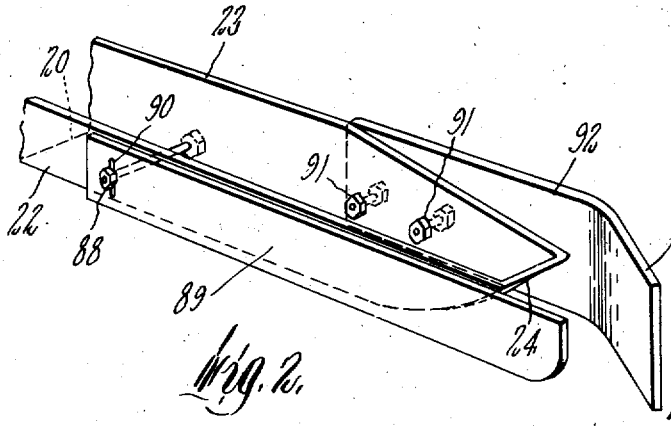
Figure 2 shows in perspective a portion of one of the runners and a floating curb associated therewith to confine road material at one side of the path of the runner.

Each runner is designated as a whole by *c*, and is preferably channelled as shown by Figures 2 and 4, so that it includes a bottom 20 slidable on a road base 21 (Figure 4) and side walls 22 and 23 upstanding from the bottom, the forward end of each runner having an upwardly inclined nose portion 24 (Figure 2), permitting it to slide freely over uneven surfaces.

The frame may be of any suitable construction, and in this instance includes two spaced apart angular beams called bridging beams attached at their ends to the runners and bridging the space therebetween. One of said beams is designated by *g* and the other by *e*, in Figures 1 and 3.

The bridging beams *g* and *e* are sectional and each is composed of angular end sections 26 (Figure 6), bolted at 27 to the end portions of the runners *c*, and a horizontal intermediate section 29 connecting the angular sections and extending crosswise of the machine. The angular end sections are adjustable on the intermediate section 29 to vary the distance between the runners, and are secured at any adjustment by clamps 31, which may be constructed as shown by Figure 7, or otherwise.

The beam *g* extends across and above the leveling plow, and the beam *e* extends along the front side of the hopper, and is lower than the beam *d*, as indicated by Figure 3.

The frame includes also longitudinal horizontal beams 30 secured to the ends of the hopper, (Figure 4), and to the ends of the fixed beam sections 29 (Figure 6).

The hopper *a* has a receiving mouth formed to receive road material discharged from a truck body to which the machine is coupled, preferably by chains 33 engaged with hooks 38 on the truck body and clevises *d* which are bolted at 35 to the ends of the hopper, or other suitable portions of the forward portion of the machine.

Each clevis is preferably a bracket formed as shown by Figures 13 and 14, said bracket including a base portion 34 and an arm portion 36 having a slot 37 formed to receive a chain link and stand between and abut ends of two adjacent links, as indicated by Figure 14.

The hopper is relatively narrow and in its front and rear walls are steeply inclined. The front wall, best shown in Figure 8, extends to an elevation not too high to permit dumping material from a truck into the hopper. The bottom edge of the front wall of the hopper terminates at an elevation above the subgrade greater than the thickness of material to be spread, so as to permit material to flow forward thereunder at its natural angle of repose and to permit a considerable portion of the weight of material within the hopper to be supported directly on the subgrade.

The hopper has a delivering outlet 39 (Figure 9) formed to permit a stream of road material 40 to flow vertically upon a road base 21, and end openings of substantial size (Figures 3, 4 and 8) to permit streams of material to flow from the ends of the hopper as well as through the bottom outlet 39. Opposite each said end opening is a plate mounted on and projecting upwardly from the adjacent runner (Figures 3 and 4). These plates prevent material which is discharged through the end openings of the hopper from flowing past or outside of the runners.

The hopper has an inclined rear wall containing a guiding recess 42 (Figure 8), in which an elongated gate 43 is slidable in an inclined path. One function of said gate is to determine the amount of material which flows back to the leveling plow *b*, this function being illustrated by Figure 9. Another function of the gate 43 is illustrated by Figure 18, and will be described in connection with said figure.

The gate 43 is adjustable to vary its height by means, which as here shown, include screw threaded adjusting rods 44 engaged with fixed nuts 45 on the upper portion of the machine, and provided with hand wheels 46. Rotation of said rods causes their endwise movement. The rods have ball-shaped lower ends 47 engaged with sockets 48 fixed to opposite ends of the gate 43, said gate being therefore adjusted by endwise movements of the rods 44. The position of the gate 43 determines the amount of material 40 which flows back to the leveling plow *b*. If the lower end of the gate is higher above the road base than the material-spreading bottom surface of the plow, there will be a surplus of material which will increase the width of the layer spread by the plow. The gate is therefore a regulator of the total width of road surface spread rather than the depth of the layer.

The gate 43 is provided at its midlength portion with an outlet opening 49 (Figure 17), and with oppositely movable supplemental gates 50 and 51 adapted to open and close said opening.

The supplemental gates 50, 51 constitute another element of means for preventing lateral movement of the machine, these gates being operable by levers 56 and connecting rods 57 to quickly open and close the outlet opening 49 to any extent required to direct a greater or lesser amount of material to either side of the plow for the purpose of preventing or minimizing lateral movement of the machine. The plow *b* strikes off such material as passes the gate 43 at a higher elevation than the desired grade, spreading it laterally. The plow acts as a spreader and may be made of any desired shape that will spread the material laterally. I have shown it as pointed and V-shaped, though it is not intended to limit the invention to such shaped spreader or to one with a pointed end, although that is the preferred form of spreader.

Figure 1:
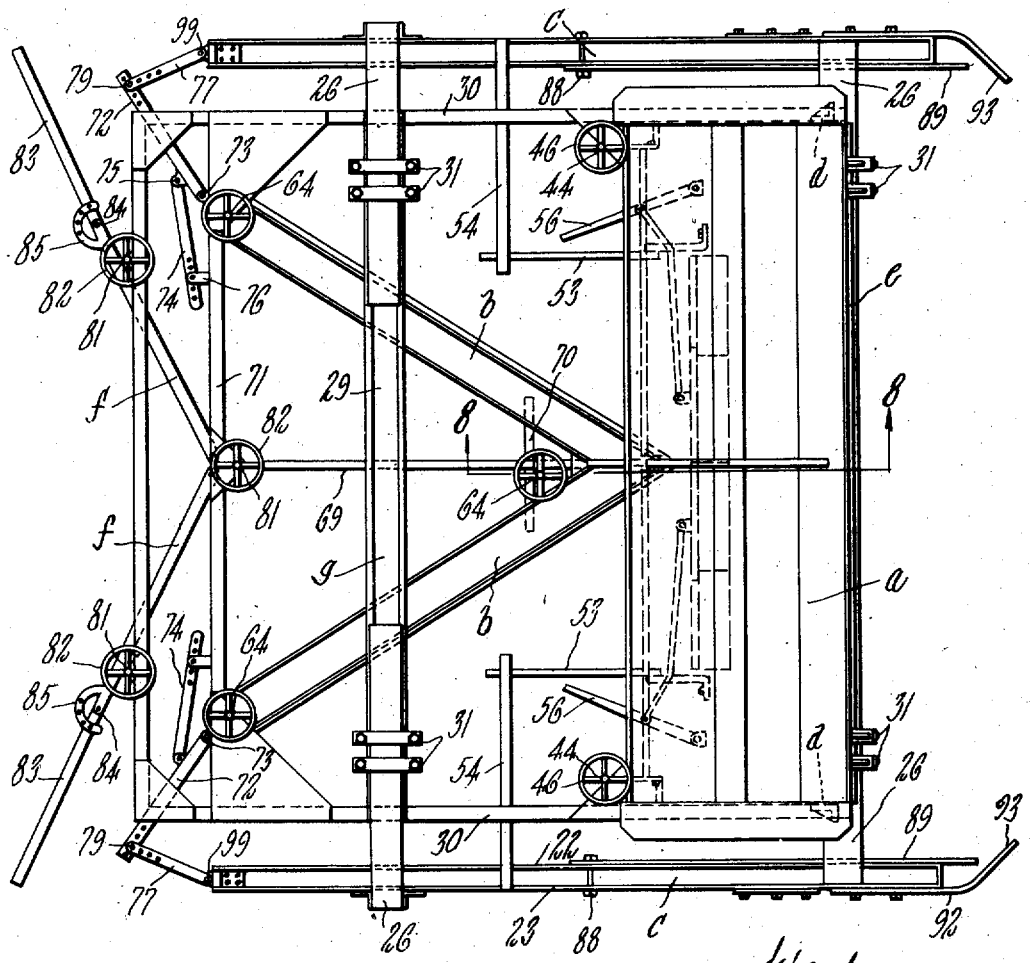
Figure 1 is a top plan view of a machine embodying the invention.

The two sides of the V-shaped plow diverge rearwardly from the acute angled forward end, as shown by Figure 1, and are preferably provided with a V-shaped shoe constituting the leveling edge or surface of the plow. Said shoe, as shown by Figures 8 and 9, includes a flange portion 60 bolted at 61 to the body of the plow, and a leveling portion 62 joined to the flange portion by a rounded nose portion 63. The leveling portion 62 has a bottom face of substantial width which slopes downwardly and rearwardly at a small angle to the horizontal. The shoe thus formed is adapted to impart a smooth top surface to a layer of road material being spread, when said material is crushed stone, to cause flat surfaces of some of the fragments to face upward and form a mosaic type of road surface, as indicated by Figure 9.

The plow *b* is vertically adjustable, so that the depth of a surfacing layer and the contour of the layer may be varied. To this end, I provide adjusting means, preferably embodied in three screw threaded adjusting rods 64 engaged with fixed nuts 65 (Figure 5), and having ball-shaped lower ends 66 contained in sockets 67 fixed to the plow, one of the adjusting rods 64 being located near the apex of the plow, and the other two near the rear ends of the plow sides, as shown by Figure 1. The fixed sockets 67 are correspondingly located, and the arrangement is such that the plow may be variously adjusted by rotating the rods. For example, the plow may be adjusted only by rotation of the forward rod 64 to vary the inclination of the leveling surface or shoe of the plow, or by rotation of each of the rods, to raise or lower the plow to maintain its leveling surface at any desired height, and substantially parallel with the road bed.

The nut 65 engaged with the forward adjusting rod 64 may be secured, as shown by Figure 8, to a a longitudinally extending supporting bar or beam 69, forming a fixed element of the frame, and the socket 67 engaged with the forward rod may be secured to a cross bar 70 (Figures 1 and 8) attached to the plow.

The nuts engaged with the two rear adjusting rods 64 may be attached to a fixed transverse frame member 71 (Figure 1), extending between, and fixed to, the longitudinal frame members 30.

The plow *b* is formed and arranged to form a leveled area of predetermined width on material deposited on the road bed in the path of the plow by the hopper. Any excess material thus deposited is forced laterally by the plow outside said area, sometimes from both edges, and sometimes from only one edge of the area.

A second strike-off member shown in Figure 1 as an obtuse angled plow designated by *f* is located behind the acute angled leveling plow *b*, and is adjustable vertically so that it may stand with its lower edge slightly lower than that of the plow *b*, the object of the secondary plow being to lightly scrape or finish the surface of the spread material. The secondary, or finishing plow, may be adjusted by means like that above described for adjusting the plow *b*, said means including three screw threaded adjusting rods 81, engaged with fixed nuts on the frame, and having hand wheels 82 and ball-shaped lower ends contained in sockets fixed to the secondary plow. Extensions 83 may be pivoted at 84 to the side portions of the secondary plow and secured in different positions relatively thereto, by segments 85 fixed to said side portions, and perforated to receive locking pins engaging the side portions of the secondary plow.

The bottom, or outlet, of the hopper may be contracted by an independently formed wedge-shaped chute shown by Figures 11 and 12, to further vary the width of a layer of material spread by the machine. Said chute is composed of two tapering or approximately wedge-shaped plates 85 pivotally connected with each other at 86, so that the width and taper of the chute may be varied as indicated by dotted lines in Figure 12. When the chute is inserted in the hopper, its opposite edges bear on inclined portions of the chute walls, and contract the chute outlet so that material is allowed to escape through only one end portion of the outlet, as indicated by Figure 11. The chute may be inserted in either end portion of the hopper.

The runners *c* are elongated and extend from the forward to the rear portion of the machine, and preferably from points near the truck without interfering therewith, to points abreast the rear ends of the V-shaped plow *b*, as shown by Figure 1, so that they do not interfere with the distribution of the road material behind the plow. The runners therefore are formed to have elongated bearings on the road bed and adapted to bridge hollows between raised portions thereof, and glide over such raised portions, and effectively support the machine.

The inner side walls 22 of the channeled runners are of a width greater than the predetermined depth of a layer of road material spread by the machine, so that their upper edges are spaced above the road bed a substantial distance, preferably about nine inches. As indicated by Figure 4, they contact with the road material 40 in such manner that said material guides the runners in predetermined straight paths, and prevents side sway of the machine from a predetermined path. It will be seen, therefore, that the runners, characterized as above stated, perform the dual function of distributing the weight of the machine over an elongated road base portion and thereby guiding it unobstructedly and easily over inequalities in said portion, and preventing side sway of the machine. The runners are spaced apart so that they define the opposite edges of the spread layer of material 40, said material being forced by the spreading action of the plow directly against the inner sides of the runners. The runners need not, however, constitute the sole support of the machine. The surfacing machine may be connected to a truck by chains fastened to the forward end of the surfacing machine in such manner that as the truck moves forward, some lifting action is exerted on the surfacing machine. The lower edges of the plow *b* ride on the spread material, tending to compress it, thereby carrying some of the weight of the machine. Supplemental means for preventing side slip of the machine may be provided by longitudinally extending thin plates or fins 53, there being a fin at each side of the longitudinal center of the machine, as shown by Figure 1. Each fin is attached at its forward end to an arm 53 fixed to the rear wall of the hopper and at its rear end to an arm 54 fixed at 55 to a runner *c*. These fins enter the material being spread, and each acts like the center board of a boat in minimizing lateral movement of the body to which it is attached.

It is seldom that a road is built of such width that all of the material may be spread by one operation. I have found that it is practically impossible to spread any road material a distance over sixteen feet, regardless of the shape of the plow, the weight of the machine, and the power used to draw it, for the simple reason that the road material is of such nature that its units do not move freely in a horizontal direction under pressure, but tend to build up to a considerable height within a limited area, without much spreading horizontally. The road must therefore be built by spreading two or more layers edge to edge. In many instances the spreading is done between road shoulders which have insufficient stability to guide the machine in a predetermined path. The runners of my machine, characterized as stated, enable the road to be built by spreading two or more layers without liability of departure of the machine from a predetermined path.

In order that a desirably smooth and even road surface may be produced under conditions attending the use of any machine of this type it is necessary, first that the machine be equipped with long runners to guide it over the usual inequalities on elongated portions of the road base or bed; and secondly, that the spreading plow be firmly connected with the runners and be immovable vertically and horizontally relative thereto when the machine is in operation. Any loose independent movement of either of these elements would cause inequalities in the finished surface. It will be seen that the plow and the runners of my machine are rigidly connected with each other, the plow being vertically adjustable, and the runners being laterally adjustable, as described, to vary the space between them, the illustrated adjusting means permitting quick and convenient adjustment of the runners.

Quick adjustment of the runners is important because a road is usually gradually widened at a curve to a maximum width, and then gradually narrowed to the end of the curve. In practice I have found it impossible for truck drivers to keep their trucks in a predetermined straight line. The runners of my machine characterized as described compensate for this inability and enable the operator to keep the road material in a certain predetermined area even though the machine may depart from a predetermined line.

To the inner side of each runner c is pivoted by a rod 88 fixed to the runner, a floating curb plate 89 (Figures 1 and 2), which is permitted by a slot 90 to rise and fall edgewise and bear along its entire length on the road bed, even though the front of the machine and the runners are lifted slightly from the road bed by a fragment of the road material, as indicated by Figure 4a, thus preventing any considerable number of fragments from being lodged under the runner and raising the entire machine including the levelling surface of the plow.

To the outer end of each runner is rigidly secured by bolts 91 a deflector plate 92 (Figures 1 and 2), having an oblique forward end portion 93 arranged to sweep fragments, dirt, and other obstacles from the path of the runner.

Another use of the machine is shown diagrammatically by Figure 18 in which 94 designates material roughly piled or windrowed on the road bed. The machine is connected as by the chains 33 with a tractor 95, which travels over the material 94. The hopper space, open at its bottom, thus becomes an open bottomed receiver into which the material is first lifted by the lifting action of the inclined gate 43, and from which the lifted material is subsequently deposited on the road bed by gravity to complete a layer previously formed, but not of sufficient depth.

I provide a bottomless enclosure or receptacle at each side of the rear portion of the machine adapted to accumulate road material at the rear ends of the runners, drag the same forward over a layer of spread material and permit the dragged material to drop into hollows which may be left in the surface of the layer, and stroke the dropped material leaving it flush with properly located portions of said surface.

The bottomless receptacles or drags shown by Figure 1 comprise outer wings 77 having forward ends connected by hinges 99 with the rear ends of the runners, and inner strike-off members or wings 72 having forward ends connected by hinges 73 with the frame at points adjacent the rear ends of the plow, and rear ends coupled at 79 to the rear ends of the outer wings, preferably by bolts entering orifices in the wings, as shown by Figure 1. Said wings have side faces perpendicular to the road base, and leveling lower edges spaced above said base, said edges being designated by 78 in Figure 3. The wings form bottomless receptacles open at their forward ends and adapted to collect surplus material left in their path by the plow, and permit such material to drop into hollows in the surface of the spread material. Said receptacles are also adapted to collect material from high places left on the layer and drop the same into hollows or low places. The bottomless receptacles or drags shown by Figures 19 to 23 comprise wings 96 having forward ends connected by hinges 99 with the rear ends of the runners, and inner strike-off members or wings 98 having forward ends connected by hinges 97 with the frame at points adjacent the rear ends of the leveling plow b, and rear ends coupled to the rear ends of the outer wings 96 by loose coupling means, including in this instance arms 100 fixed to the inner wings, and slidable in slots 101 on the outer wings.

The wings 96 and 98, like the above described wings 72 and 77, have side faces perpendicular to the road base and leveling lower edges spaced above said base, and form bottomless angular receptacles adapted to function like the receptacles first described.

Figure 19:
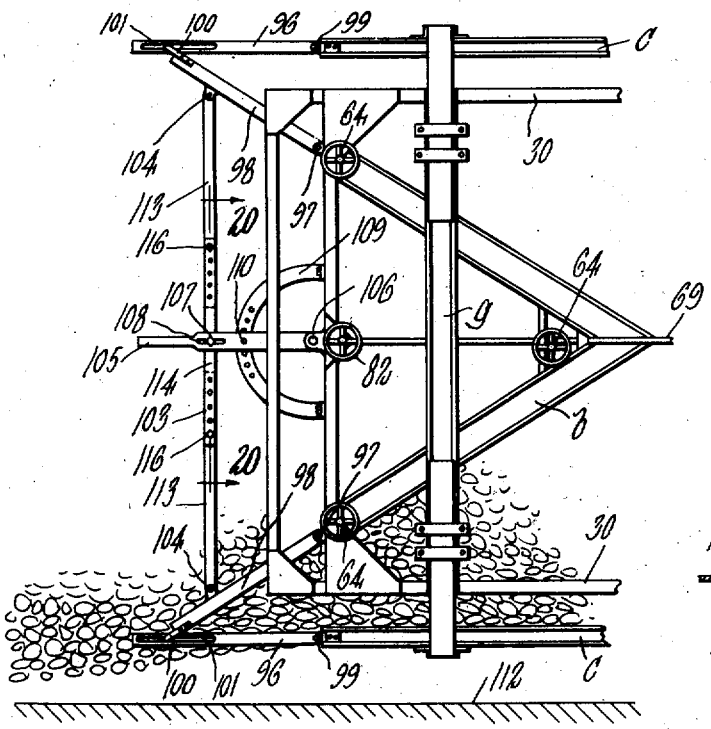
Figures 19 to 23 show a different embodiment of the invention.
Figure 21:
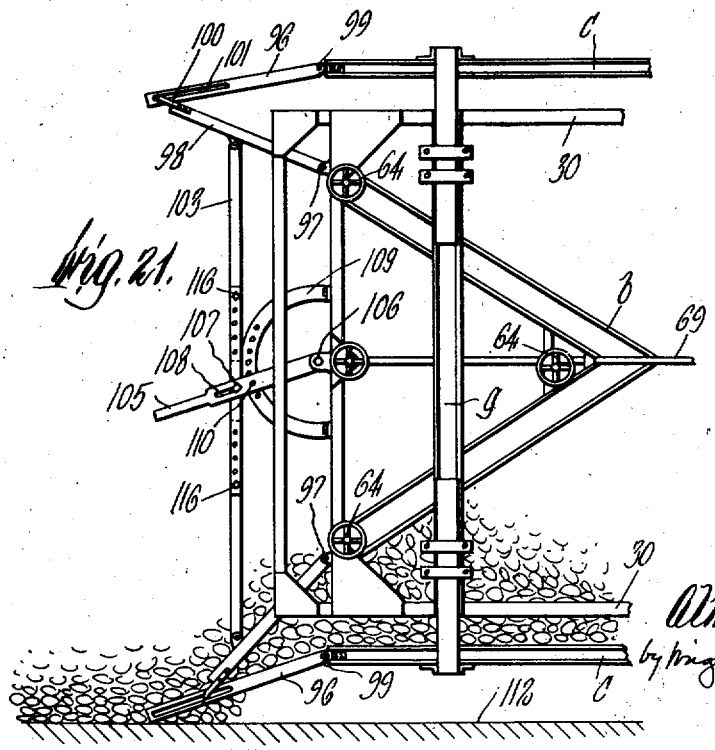
Figure 23:
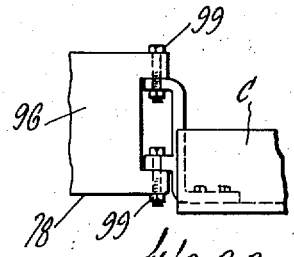
Figure 22:
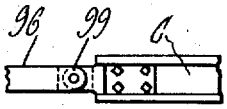

The receptacles formed by the wings 96 and 98 are simultaneously and bodily adjustable laterally to vary the obliquity of their side faces, and the distribution by the receptacles of material collected thereby, the adjustability being such that the receptacle may cause simultaneous distribution at both edges of the area leveled by the plow b, as indicated by Figure 19, or distribution at only one edge of said area, as indicated by Figure 21.

Figure 20:
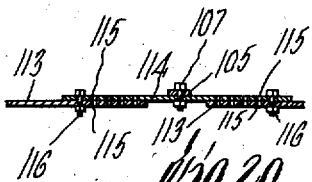

The preferred adjusting means shown by Figures 19 and 20 includes a connecting rod 103 connected by pivots at 104 with the inner wings 98, and extending between said wings. A hand lever 105 is pivoted at 106 to the frame, and engaged with the midlength portion of the rod to move the latter endwise, the engagement being preferably effected by a stud 107 fixed to the rod, and extending through a slot 108 in the lever.

Detent members are provided to confine the lever in any position to which it is movable. Said members preferably include a sector 109 fixed to the frame, and having an arcuate row of holes, either of which may receive a pin 110 engaged with the lever.

It will now be seen that the bottomless receptacles may be bodily moved to the positions shown by Figure 19, to add equal quantities of leveled material to each edge of the area leveled by the plow, and to the positions shown by Figure 21 to add more leveled material to one edge of said area than to the opposite edge. An operator walking behind the machine manipulates the lever 105 to bodily move the receptacles, and cause such distribution as may be required by different conditions. For example, the material distributed by one of the receptacles may be extended to a curb 112 at one edge of the road base, as shown by Figure 21.

The bottomless receptacles outside the spaced apart rear ends of the plow are important elements of the machine, enabling the road material to be uniformly surfaced regardless of varying conditions of the road bed, said receptacles being adapted to carry along excess road material and drop enough of it to fill low places in the road and to receive and remove excess material from high places. The bottomless receptacles are useful in placing a second strip of road material parallel with a first strip, a receptacle being carried over the meeting edges of the strip and depositing material on said edges to obliterate irregularities thereon. There is a constantly varying demand for material to compensate for these irregularities. If the regulating plate 43 on the back side of the hopper a be raised to permit a discharge of more material than is required, there will be a spillage at the rear ends of the plow b which, without the bottomless receptacles must be taken care of by hand. Said bottomless receptacles are adapted to carry along excess material to provide for low places, no hand labor being required.

The rear ends of the spreading plow are arranged to carry the road material outside the rear ends of the runners. This is necessary in road work, because curb stones and such removable objects are often put in place before the application of the surfacing material.

My machine, characterized as above, provides means for spreading under various conditions, for example, when it is desired to spread a narrow strip of material beside another strip previously spread. It will be seen that a runner *c* overlapping on a first spread or layer of road material is adapted to cut its way to the road bed through the loose material, and, while operating in this manner, material will be placed in the additional width, and any imperfection caused by the driving of truck wheels over the previously spread stone will be ironed out in the natural course of events. The groove made by a runner *c* in the loose road material will be closed up and ironed out by the corresponding bottomless receptacle.

In view of the fact that the width of the supporting frame and the distance between the runners are variable as already described, I make the connecting rod 103 telescopic so that its length may be varied. Said rod may be composed of two end sections 113 and intermediate sections 114, (Figure 20). The lever 105 is connected by the stud 107 with the intermediate section, and orifices 115 are formed in the end sections receiving bolts 116 adjustably connecting the end sections with the intermediate section.

It will now be seen that the machine is capable of spreading a smooth surfaced layer on a somewhat uneven base; the relatively long channelled runners being adapted to bridge depressions in the base, so that the bottom of the layer conforms to such depressions, and its top is smoothly finished.

The channelled runners, as already stated, are adapted to retain within definite limits, material spilled from a truck.

The means provided for preventing side slip, or lateral deviation, of the machine from the desired path or course, and the various other features of the machine, imparting thereto the described advantages, are important factors.

It will be noted that the spreading edges 62 of the spreading plow *b* are slanted downwardly toward the road surface as indicated by Figures 8 and 9, so that in the case of stone or other fragmentary material said edges have a tendency to turn the flat sides of fragments upward, as already described, a very desirable effect. It will also be noted that the lower or scraping edges of the wings constituting the bottomless receptacles are arranged to extend this turning action on fragments in their paths. The result is that in the case of both hot and cold mixtures which include sticky substances such as tar or asphalt, the surface fragments are held to the surface of the spread road material by the pressure exerted by the spreading edges of the plow *b* and by the scraping edges of said wings, and there held in place while said edges are passing over the material.

I claim:

1. A road surfacing machine comprising in combination two elongated parallel runners, a hopper between the runners, the hopper being adapted to receive material to be spread and deliver it between the runners, the runners extending rearwardly of the hopper and restraining the sidewise spread of the material discharged from the hopper as the machine is moved forward on a road bed, means for regulating the discharge of material from the hopper, a leveling plow behind the hopper, and additional spreading means cooperating with said plow and adjustably movable laterally relative to the plow for laterally spreading material behind the hopper to a greater width than the length of the hopper.

2. A road surfacing machine as specified by claim 1, comprising also bottomless receptacles composed of scraping wings pivotally connected to each other and to the rear ends of the runners and the plow, said receptacles being open at their forward ends and formed and arranged to receive and carry forward surplus material spread by the plow, drop the same into hollows in the spread surface behind the plow, and level the dropped material, means connecting said receptacles with each other, and means for confining said receptacles in predetermined positions relative to each other.

3. A road surfacing machine as specified by claim 1, comprising also bottomless receptacles composed of scraping wings pivotally connected to each other and to the rear ends of the runners and the plow, said receptacles being open at their forward ends and formed and arranged to receive and carry forward surplus material spread by the plow, drop the same into hollows in the spread surface behind the plow, and level the dropped material, means connecting said receptacles with each other, and means for confining said scraping wings in predetermined positions relative to each other, said confining means being organized to laterally adjust said scraping wings so that either bottomless receptacle formed thereby may project laterally outward from the runner and the plow side with which it is associated to cause the material dropped from the receptacle to overlap one edge of a layer previously formed by the machine, and thereby level the joint formed by the meeting of said layers.

4. A road surfacing machine as specified by claim 1, said plow having a leveling edge formed by a V-shaped shoe including a rounded outer portion and a sloping flange portion joined to, and extending rearwardly therefrom, said shoe being formed to impart a smooth surface to the material being spread, and turn upward flat surfaces of stone fragments to impart a mosaic effect to the road surface.

5. A road surfacing machine as specified by claim 1, comprising also a supporting frame mounted on the runners, and plow-adjusting means supported by the frame and connecting the plow therewith, said adjusting means including an element independently connecting the apex portion of the plow with the frame, and two elements independently connecting the rear end portions of the plow with the frame, each of said elements including a screw threaded rod engaged with a fixed nut on the frame and having a ball-shaped end, and a socket fixed to the plow and receiving said ball-shaped end.

6. A road surfacing machine as specified by claim 1, comprising also means for adjusting the distance between the runners.

7. A road surfacing machine as specified by claim 1, comprising also an adjustable gate for the hopper for regulating the quantity of material spread by the hopper, a frame mounted on the runners, the plow being formed and arranged to form a leveled area of predetermined width on material deposited in the path of the plow by the hopper, the machine comprising also means for distributing and leveling surplus material forced by the plow outside the leveled area, said means being embodied in outer wings having forward ends hinged to the runners, and inner wings having forward ends hinged to the rear end portion of the plow, and rear ends coupled to the rear end of the outer wings, said wings having side faces perpendicular to the road base and leveling lower edges spaced above said base, the wings forming angular bottomless receptacles open at their forward ends and adapted to collect and drop surplus material.

8. A road surfacing machine as specified by claim 1, comprising also an adjustable gate for the hopper for regulating the quantity of material spread by the hopper, a frame mounted on the runners, the plow being formed and arranged to form a leveled area of predetermined width on material deposited in the path of the plow by the hopper, the machine comprising also means for distributing and leveling surplus material forced by the plow outside the leveled area, said means being embodied in outer wings having forward ends hinged to the runners, and inner wings having forward ends hinged to the plow adjacent the rear ends thereof and rear ends coupled to the rear end of the outer wings, said wings having side faces perpendicular to the road base and leveling lower edges spaced above said base, the wings forming angular bottomless receptacles open at the forward ends and adapted to collect and drop surplus material, said means including also a connecting rod pivoted to and extending between the inner wings of the receptacles, a hand lever pivoted to the frame and engaged with the mid length portion of said rod to move the latter endwise, and detent members adapted to confine the lever in any position to which it is movable, the rear ends of the wings of each receptacle being loosely coupled together.

9. A road surfacing machine as specified by claim 1, comprising also an adjustable gate for the hopper for regulating the quantity of material spread by the hopper, a frame mounted on the runners, and an obtuse angled scraping or finishing plow supported by the frame behind the leveling plow, means being provided for maintaining the lower edge of the finishing plow lower than that of the leveling plow.

10. A road surfacing machine as specified by claim 1, comprising also an adjustable gate for the hopper for regulating the quantity of material spread by the hopper, a frame mounted on the runners, an obtuse angled scraping or finishing plow supported by the frame behind the leveling plow, means being provided for maintaining the lower edge of the finishing plow lower than that of the leveling plow, the scraping plow being provided with swinging extensions and with means for maintaining said extensions in any positions to which they may be swung.

11. A road surfacing machine as specified by claim 1, comprising also an adjustable gate for the hopper for regulating the quantity of material spread by the hopper, a frame mounted on the runners, an obtuse angled scraping or finishing plow supported by the frame behind the leveling plow, means being provided for maintaining the lower edge of the finishing plow lower than that of the leveling plow, said runners being provided with inner side walls perpendicular to a road base, and with floating curbs pivotally connected with said walls and adapted to bear constantly on the road base.

12. A road surfacing machine as specified by claim 1, comprising also an adjustable gate for the hopper for regulating the quantity of material spread by the hopper, a frame mounted on the runners, an obtuse angled scraping or finishing plow supported by the frame behind the leveling plow, means being provided for maintaining the lower edge of the finishing plow lower than that of the leveling plow, said runners being provided with upwardly projecting outer side walls and with deflector plates fixed to said outer walls, and having deflecting forward end portions extending obliquely across the forward ends of the runners.

13. A road surfacing machine as specified by claim 1, comprising also an approximately wedge-shaped chute loosely insertable in the hopper, and formed to contract the outlet thereof, and direct road material toward an end portion of said outlet, the chute being reversible so that the material may be directed toward either end portion of the hopper outlet.

14. A road surfacing machine as specified by claim 1, comprising also an approximately wedge-shaped chute loosely insertable in the hopper and formed to contract the outlet thereof and direct road material toward an end portion of said outlet, the chute being reversible so that the material may be directed toward either end portion of the outlet, said chute being composed of two approximately wedge-shaped plates pivotally connected at their midlength portions, and adapted to be adjusted relative to each other to vary the width of their opposite ends and the inclination of their outer longitudinal edges.

15. A road surfacing machine as specified by claim 1, comprising side sway opposing longitudinal fins supported by the machine at opposite sides of the longitudinal center thereof and between the runners, said fins having opposite side faces perpendicular to a road base, the side faces of said fins being arranged to contact with and be guided by road material delivered by the hopper.

16. A road surfacing machine as specified by claim 1, comprising also means associated with the hopper for selectively directing material delivered thereby toward either side of the apex of the plow.

17. A road surfacing machine as specified by claim 1, said hopper having an inclined rear wall partly defining the discharging outlet of the hopper, an inclined adjustable gate guided by the said rear wall, and movable in an inclined path into and out of said outlet, and means for adjusting said gate, and maintaining it in any position to which it may be adjusted, the arrangement being such that the inclined gate may be adjusted at a higher point above the road bed than the leveling plow to add to the width of a layer of material leveled by the plow, and at a lower point to raise material in the path of the gate into the hopper, and permit the subsequent distribution of the raised material by gravity, said inclined gate being provided with an outlet opening in its midlength portion, and with a pair of supplemental gates independently movable in opposite directions in said opening to permit side sway opposing discharge of material at either side of the path of said plow, means being provided for independently moving said supplemental gates.

18. A road surfacing machine comprising in combination two elongated parallel runners, a hopper between the runners, the hopper being adapted to receive material to be spread and deliver it between the runners, the runners extending rearwardly of the hopper and restraining the sidewise spread of the material discharged from the hopper as the machine is moved forward on a road bed, means for regulating the discharge of material from the hopper, means adjustable laterally relative to the runners for laterally spreading material behind the hopper to a greater width than the length of the hopper, and means for adjusting the distance between the runners.

19. A road surfacing machine comprising, in combination, two elongated parallel runners, a frame supported on the runners, a hopper of less length than the distance between the runners supported on the frame, means for regulating the discharge of material from the hopper bottom to the roadbed as the machine is moved forward, adjustable spreader means supported on the frame at an interval behind the hopper for spreading surplus material from the hopper toward the runners, said runners extending rearwardly in contact with spread material a sufficient distance to prevent sidewise sway of the machine due to uneven spreading action on opposite sides of said plow.

20. A road surfacing machine comprising in combination elongated parallel runners, a horizontal elevated frame supported on said runners, a hopper and a plow supported by said frame between said runners, and means for adjusting each of said runners laterally with respect to the frame.

21. A road surfacing machine comprising in combination elongated parallel runners, a horizontal elevated frame supported on said runners, a hopper and a plow supported by said frame between said runners, means for adjusting said runners laterally with respect to the frame, and wing extensions hinged to the ends of said plow and adjustable to vary the effective width of the plow.

22. In a road surfacing machine, a hopper, means for regulating the discharge of material from said hopper, a strike-off member behind said hopper and spaced therefrom and having a bottom shoe with a V section, said shoe having a bottom face of substantial width in direct contact with the road material and sloping downwardly and rearwardly at a small angle to the horizontal so as to impart a smooth surface to the material being spread.

23. A road surfacing machine comprising a frame, a hopper mounted on said frame, means for regulating the discharge of material from said hopper, a leveling plow secured to said frame behind said hopper, and an obtuse angled scraping or finishing plow supported by said frame behind the leveling plow, means being provided for maintaining the lower edge of the finishing plow lower than the leveling plow.

24. A road surfacing machine comprising an elongated hopper, a pair of parallel runners extending rearwardly from said hopper outside the ends thereof and adjustable laterally away from the ends of the hopper, means including said runners for preventing side sway of said machine, said means also including a substantial opening in each end of said hopper and a plate projecting upward from each runner opposite the opening in the adjacent end of the hopper, and leveling means behind the hopper for spreading material discharged therefrom.

25. In a road surfacing machine, a strikeoff member mounted at an oblique angle to the direction of travel of the machine, said member having a bottom face of substantial width directly engaging the road material and sloping downwardly and rearwardly at a small angle to the horizontal, an upstanding front face, and a rounded surface connecting said faces.

ALMA N. NICKERSON.